Figure 1:
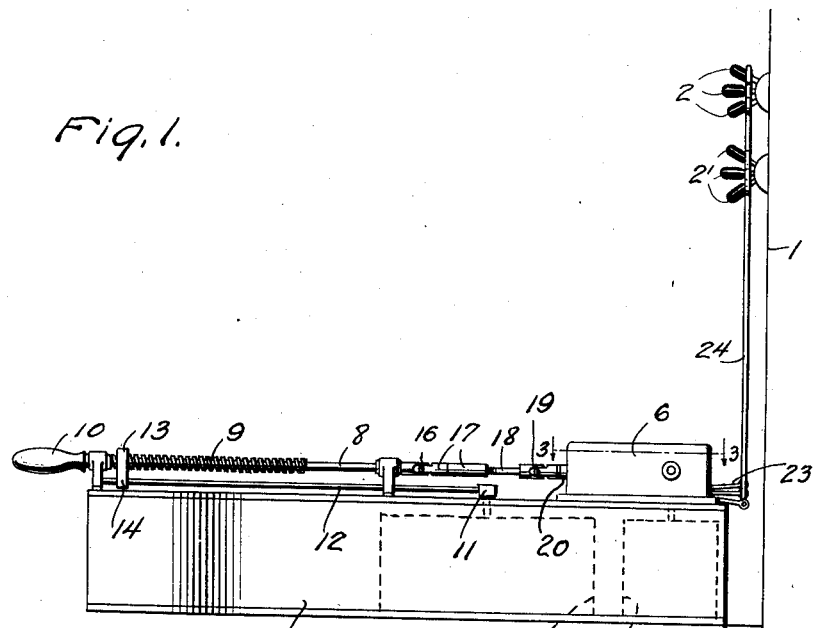

Dec. 8, 1925.

H. C. HARRISON 1,565,092

ATTACHMENT FOR OSCILLATION GENERATORS

Filed June 23, 1921    3 Sheets-Sheet 1

Inventor:
Henry. C. Harrison,
by C. A. Sprague Atty.

Dec. 8, 1925.
H. C. HARRISON
1,565,092
ATTACHMENT FOR OSCILLATION GENERATORS
Filed June 23, 1921
3 Sheets-Sheet Inventor:
Henry C. Harrison,
by C. A. Sprague Atty.

Dec. 8, 1925.  
H. C. HARRISON  
1,565,092  
ATTACHMENT FOR OSCILLATION GENERATORS  
Filed June 23, 1921  3 Sheets-Sheet 3

Inventor:  
Henry C. Harrison  
by C.C. Sprague. Atty.

Patented Dec. 8, 1925.

1,565,092

UNITED STATES PATENT OFFICE.

HENRY C. HARRISON, OF PORT WASHINGTON, NEW YORK, ASSIGNOR TO WESTERN ELECTRIC COMPANY, INCORPORATED, OF NEW YORK, N. Y., A CORPORATION OF NEW YORK.

ATTACHMENT FOR OSCILLATION GENERATORS.

Application filed June 23, 1921. Serial No. 479,798.

*To all whom it may concern:*

Be it known that I, HENRY C. HARRISON, a citizen of the United States, residing at Port Washington, in the county of Nassau, State of New York, have invented certain new and useful Improvements in an Attachment for Oscillation Generators, of which the following is a full, clear, concise, and exact description.

This invention relates to oscillation generators of the type having an adjustable oscillatory circuit.

The primary object of this invention is to provide a circuit setting and a frequency indicating attachment for an oscillation generator.

Another object is to supply a simple device which will effect the desired adjustments with accuracy and despatch.

Still another object is to provide a controller for adjusting and indicating the frequency and simultaneously suppressing the harmonics of the current supplied by the oscillator.

Oscillation generators adapted to produce alternating currents of different frequencies extending over a wide range are well known. In order to generate currents of widely different frequencies with a single circuit arrangement, it is necessary to provide means whereby the natural period of the oscillatory circuit may be varied between wide limits. Moreover, to supply a wave of fundamental frequency only to the load circuit, a wave filter adapted to suppress harmonics of the fundamental frequency, normally produced by an oscillator of this type, is in general connected between its output circuit and the load circuit to which the current is supplied.

One arrangement for this purpose comprises an electric discharge device having a cathode, an anode and a grid, an inductance having a subdivided portion, a subdivided condenser, a continuously variable condenser and a series of switches and controllers associated therewith, and inductances and capacities together with a series of control switches therefor. One group of switches and the controllers are separately operated to regulate the amount of the inductance, the number of subdivisions of the main condenser and, if desired, the portion of the auxiliary condenser included in the oscillatory circuit to determine its natural period. The second group of switches, also separately operated, are adapted to control the values of the inductance and capacities of the second group connected between the output terminals of the oscillator and the load circuit, to constitute a wave filter adapted to pass a definite band of frequencies which includes that determined by the setting of the oscillatory circuit.

The oscillator referred to above is in one instance designed to supply currents of frequencies varying from 200 to 3000 cycles, and in order to provide oscillatory circuits having natural periods variable between corresponding limits, six inductance subdivisions and ten main condenser subdivisions are employed, in association with the continuously variable condenser. Moreover, variations of the filter constants are effected in six steps. Hence there are six switches in each group. Each switch has three positions which may be designated "up," "neutral" and "down" and the switches are arranged in pairs which are simultaneously operated. Since the main condenser is varied in ten steps its controller will be provided with ten contacts.

By actuating the switches and controllers in proper sequence, the frequency of the current supplied to the load circuit may be varied from the minimum to the maximum limit for which the oscillator is designed.

To illustrate the sequence of operation of the switches and controllers the following description of the order in which they are actuated to effect variation of the constants of the oscillatory circuit and filter for a part of the frequency range is believed to be sufficient. In the following general description the switches or keys will be referred to as switches or keys 1 to 6, and the contact positions of the main condenser controller by 1 to 10. These numerals are used to identify the order of operation of the switches and the several contact positions of the condenser controller and do not appear in the drawings.

To supply a current of 200 cycles to the load circuit, switches 1 will be "up," the other five "down," and the main and auxiliary condenser controllers will be in "off" position. To effect variation of the frequency between 200 and 300 cycles, the auxiliary condenser controller will be actuated throughout its complete range, the controller for the main condenser will be moved to position 1, the auxiliary condenser controller will then be operated throughout its range, next the main condenser controller will be moved to position 2, then the auxiliary condenser controller will be moved over its complete range, the main condenser controller will then be moved to position 3, the auxiliary controller over its complete range, and so on; until the frequency of 300 cycles is reached.

At this position keys 1 will be moved to "neutral" keys 2 will be moved to the "up" position, and the other keys will remain "down." The main and auxiliary condenser controllers will then be alternately operated, as described above, and the frequency of the current supply will thus be varied between 300 and 450 cycles. For a frequency range between 450 and 700 cycles, keys 2 will be returned to "neutral," keys 3 will be moved to the "up" position, the other keys will remain in "down" position, and the main and auxiliary condenser controllers will be operated in the order described above for the first frequency range.

For succeeding frequency ranges, that is, 700 to 1000, 1000 to 1500, and 1500 to 3000, the position of the switches 3, 4, 5, and 6 will be changed successively as just described for switches 1 and 2, and after the actuation of each switch the condenser controllers will be operated in the order described above until in the final position the keys 6 are "up," the others are "neutral," and the condenser controllers occupy their final positions.

In this manner different combinations of inductances and capacities are provided both for the oscillatory circuits and the filters. Of course in the initial position of the switches and controllers, that is, for a frequency of 200 cycles, a fixed amount of capacity is associated with a fixed value of inductance in the oscillatory and filter circuits.

By properly subdividing the inductance, using equal subdivisions of the main capacity, and giving the auxiliary condenser a capacity value equal to one subdivision of the main condenser, a generator adapted to supply currents of frequencies which may be continuously varied over the complete range for which it is designed may be obtained.

The present method of frequency setting which requires the manual operation of the different switches and controllers is both slow and awkward, is a tax upon the operator, and depends for its accuracy upon the proper selection and setting of the switches and controllers. These disadvantages are particularly noticed whenever an attempt is made to swing the frequency back and forth over a range of values as is required, for example, when attempting to determine the resonance point during impedance analysis measurements. Moreover, since the change of frequency produced by a slight movement of the auxiliary condenser controller produces a relatively small change in the frequency supplied to the load circuit, the degree of accuracy of the setting will depend upon the ability of the operator to effect the proper adjustment, and if absolute accuracy is required this will involve checking and readjusting the setting. The attachment to be hereinafter described is adapted to overcome these difficulties and expedite the frequency setting of an oscillation generator.

In accordance with this invention a device has been provided comprising a single lever having associated with it an index finger which may be moved over a set of concentric semi-circular lines designed to denote frequencies. This lever is provided with a handle whereby it may be rotated, and is connected by a train of gears to the contact arm of the main condenser controller, and to an intermittent gear adapted to drive a cam shaft carrying a plurality of cams. Each cam is associated with a spring controlled lever connected to a pair of keys or switches. The lever is also connected to an arm mounted on a rod secured to the auxiliary condenser and about which it is adapted to be bodily rotated. Hence by rotating the handle in either direction the contact arm of the main condenser controller and the cam shaft will be rotated. The former to stepwise control the number of subdivisions of the main condenser included in the oscillatory circuit and the latter, through its cams and associated levers, will operate the switches to control the value of the inductance included in the oscillatory circuit, and also the value of the inductance and capacity included in the filter circuit associated with the output terminals of the oscillator. Movement of the lever and hence the arm about its pivotal point will effect the adjustment of the auxiliary condenser.

Figure 2:
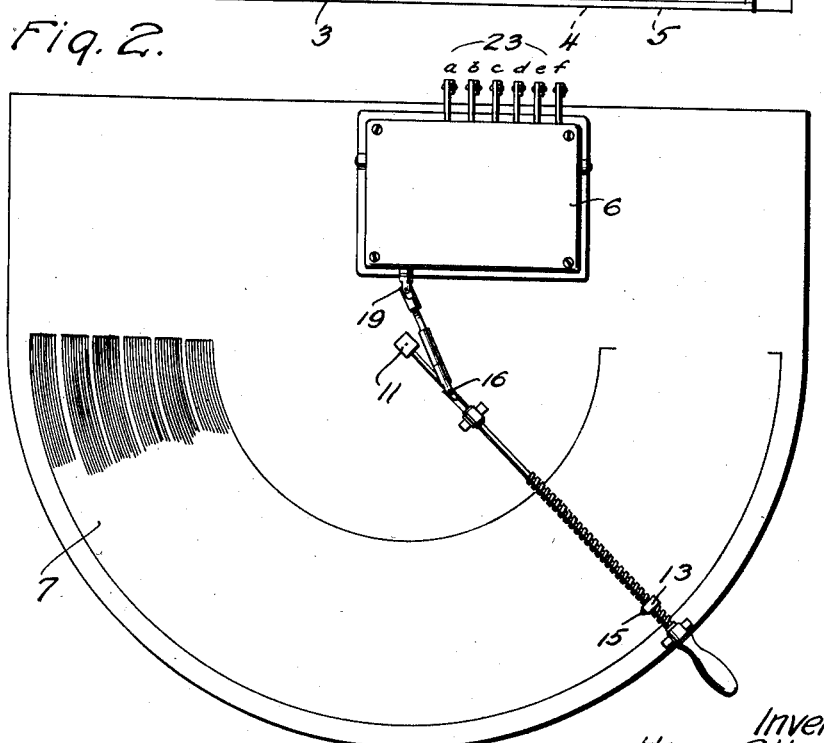
Figure 3:
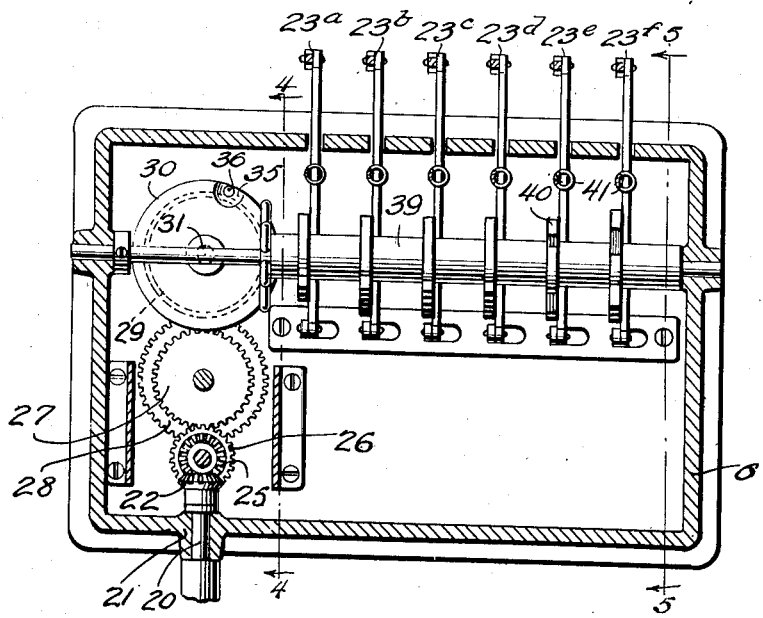
Figure 4:
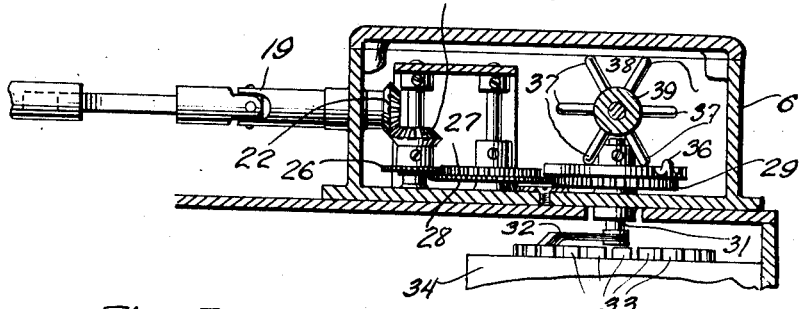
Figure 5:
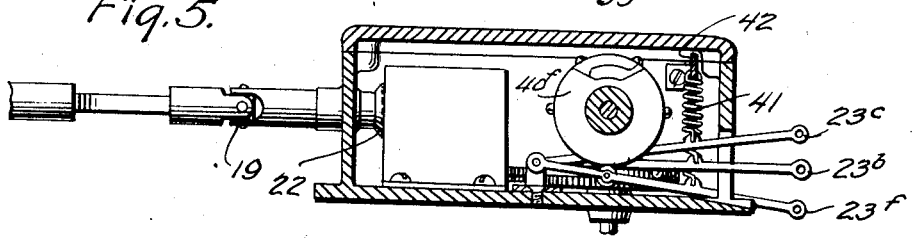
Figure 6:
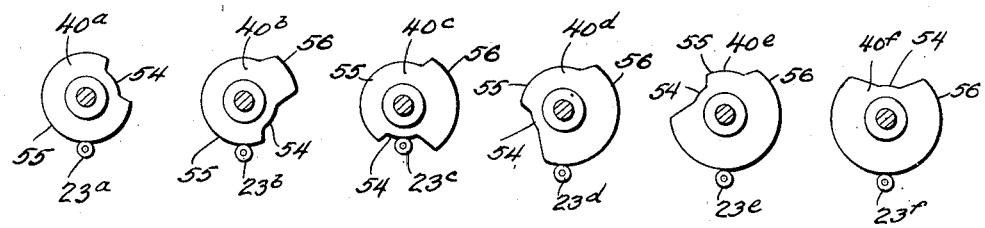
Figure 7:
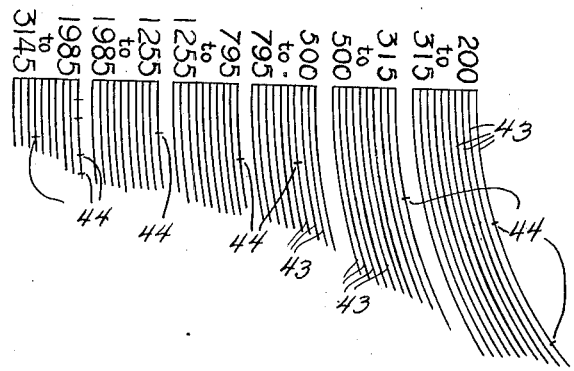
Figure 8:
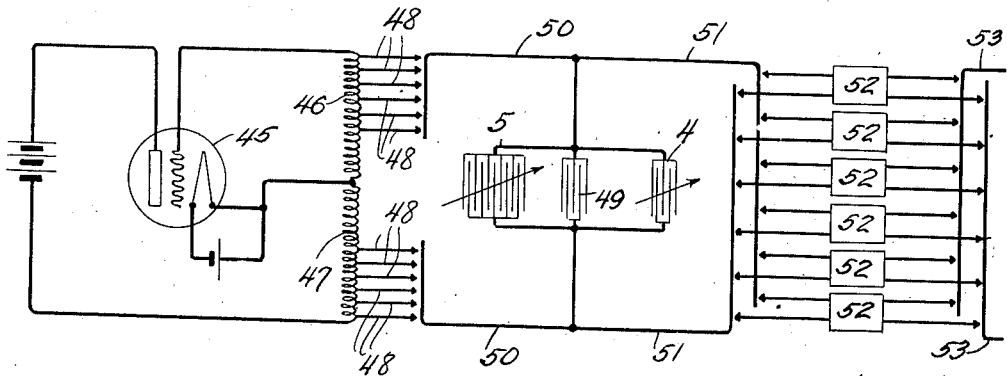

One design of device for effecting this result is shown by way of example, in the attached drawings, in which Fig. 1 is a side view of the attachment; Fig. 2 is a plan view thereof; Fig. 3 is section on line 3—3 of Fig. 1 showing the gear mechanism; Fig. 4 is section on line 4—4 of Fig. 3; Fig. 5 is a section of line 5—5 of Fig. 3; Fig. 6 shows the relative positions of the cams for one setting of the oscillatory and filter circuits; Fig. 7 shows a portion of the chart with which the index pointer cooperates; and Fig. 8 illustrates schematically an oscillator with which this attachment may be employed.

Referring to Figs. 1 and 2, 1 indicates a switchboard, which may be the face plate of an enclosing casing for the various parts of the oscillator, upon which the various circuit wires, sockets for the electric discharge devices, and control switches or keys 2 and 2' are mounted. At the base and in front of this board is a housing 3 for the condensers 4 and 5, upon which the gear casing 6 and the chart 7 are secured. The chart 7 as shown in Fig. 2 is provided with six bands of ten semi-circles. Each band or group of ten semi-circles corresponds to one inductance and filter setting of the circuits associated with the vacuum tube device.

Control lever 8 having a screw threaded portion 9 is provided with a handle 10 whereby the lever may be rotated and bodily moved in a horizontal plane. The arm 12, having one end mounted on the pivot 11 is secured to the lever 8 so that these two elements move in unison when the lever is bodily rotated about the pivotal point 11. Mounted upon the screw threaded portion of the lever 8 is a nut 13 provided with depending portions 14 engaging the arm 12 and carrying the index pointer 15. By this arrangement the nut is prevented from rotating with the handle 10, but is free to move longitudinally on the lever 8 and thereby carry the pointer 15 to indicate the semi-circular line desired.

The movable plates of auxiliary condenser 4 are carried by the pivot 11 to which the arm 12 is also secured, so that upon the rotation of the lever 8 about this pivotal point the movable plates of the auxiliary condenser will be adjusted relatively to the fixed plates associated with them.

The lever 8 is connected by a universal joint 16 to a sleeve 17 having a rectangular bore into which projects a small rod or shaft 18 connected by a universal joint 19 to a gear shaft 20. This coupling connection is designed to permit the lever 8 to be rotated by the handle 10 in all positions of the lever. The sliding connection between the sleeve 17 and rod 18 acts as a compensator to permit longitudinal movement of the lever 8 relatively to the gear shaft 20, necessitated by the fact that the pivotal point 11 about which it may be bodily rotated in a horizontal plane does not coincide with the inner end of the lever 8.

The gear shaft 20 projects through a bearing 21 into the gear casing 6, and is provided at its inner end, as shown in Figs. 3 and 4, with a beveled gear 22. A plurality of levers 23, six in number, extend from the other side of the casing 6 and are secured to a series of rods 24 each of which is connected to a pair of switches or keys 2 and 2'.

As shown in Figs. 3, 4 and 5, the beveled gear 22 meshes with a beveled gear 25 which drives a gear train consisting of the gears 26, 27, 28 and 29, to the latter of which a disc 30 is secured. The gear wheel 29 is mounted upon and secured to the shaft 31, carrying an arm 32 adapted to engage a series of contacts 33 mounted upon the exterior of the casing 34, which serves to enclose the condenser 5. The contacts 33 are connected to subdivisions of the condenser 5, and hence, as the gear 29 is rotated, contact arm 32 carried thereby will at different points in its rotary motion engage these contacts.

The gear casing 6 is provided with a detachable cover and a bracket detachably secured to the bottom thereof. The bearings for the drive gear shafts are provided in this bracket and in the bottom of the casing.

The disc 30 is provided with a depressed portion 35 within which is mounted a lug 36 adapted to engage one of the projecting arms 37 of the intermittent gear wheel 38. The gear wheel 38 is secured to a cam shaft 39 provided with a plurality of cams 40, each of which is adapted to engage one of the levers 23. A plurality of springs 41 are connected at one end to the bar 42 secured to the casing near its top, and each spring has its opposite end connected to one of the levers 23 so that the levers normally tend to occupy elevated positions.

The cams 40 are designed to determine a plurality of different positions for each of the levers $23^a$ to $23^f$ inclusive, as shown in Fig. 5, which will be designated "up," "neutral" and "down," and they are secured to the shaft to control the levers and hence the switches in a definite cycle.

Referring now to Fig. 6, the cams are differentiated by the suffixes "a," "b," "c," "d," "e," and "f," and correspond with the similarly identified levers shown in Figure 3, hence cam $40^a$ controls lever $23^a$, cam $40^b$ cooperates with lever $23^b$, and so on.

As shown in Fig. 6, cams $40^a$ and $40^f$ are provided with surfaces of two different radii, whereas the other four cams $40^b$ to $40^e$ inclusive have surfaces of three different radii. The cam $40^a$ has surfaces of the shortest and intermediate radii, and cam $40^f$ has surfaces of the intermediate and longest radii. Consequently the levers $23^a$ and $23^f$ which these cams respectively control will have but two positions, that is, lever $23^a$, and hence the switches 2 and 2' connected thereto by the associated rod 24, can occupy the "neutral" and "up" positions only, and the lever $23^f$, and therefore the switches 2 and 2' connected thereto by the corresponding rod 24, can be set only in the "neutral" and "down" positions.

Fig. 7 shows a broken section of the chart 7 for an oscillator adapted to produce a range of frequencies from 200 to 3145 cycles. This range is used merely for the purpose of illustrating one particular range of frequency which a single oscillator may produce, but it is to be understood that by a proper selection of the inductance and capacity values for the oscillatory circuit and filters, and utilizing an electric discharge device of proper design, the oscillator with which this attachment is used may operate over any range of frequencies.

In this figure the first band or group of semi-circular lines 43 indicate frequencies of 200 to 315 cycles, a second set 315 to 500 cycles and so on, while the last band indicates frequencies of 1985 to 3145 cycles. Each semi-circular line will be provided with scale marks 44 to identify the cyclage of the current generated and their number will depend upon the calibration desired. The scale may indicate unitary differences in the frequency of the current generated, but, as a matter of fact, subdivisions of five cycles will probably be found satisfactory for practical purposes.

For a complete frequency range which is subdivided as given above, an oscillator provided with a single set of inductances of 2.1, .85, .336, .136, .0534 and .0214 henries respectively, a single range of capacity values of .12 to .3 microfarads for the main condenser and a continuously variable condenser of .018 microfarads, will be used.

Fig. 8 is a diagrammatic representation of one type of vacuum tube oscillator with which the attachment herein described may be used. The three element electric discharge device 45 having a cathode, a control element and an anode, has inductances 46 and 47 respectively connected in its input and output circuits, and a plurality of taps 48 are associated with the inductances. The capacity 49 is connected to the leads 50 with which the taps 48 are designed to be selectively connected by the closure of the first of the switches 2, shown in Fig. 1. A pair of adjustable condensers 4 and 5 are shown as adapted to be connected in parallel with the condenser 49 and the inductances 46 and 47 to constitute the oscillatory circuit. Extending from the oscillatory circuit are a pair of conductors 51. Any one of a plurality of filters, diagrammatically shown at 52, may be selected and simultaneously connected to the conductors 51 and the load circuit 53 by the switches 2', shown in Fig. 1.

Upon the rotation of the lever 8 and under the control of the arm 32, different portions of the condenser 5 will be successively associated in shunt with the condenser 49 to vary the periodicity of the oscillatory circuit. By bodily rotating the lever 8 about the pivotal point 11, any desired portion of the condenser 4 may also be connected in parallel with the condenser 49 or condenser 49 and a desired subdivision or subdivisions of the condenser 5.

Each filter is designed to pass only frequencies below the upper limit of the range indicated by a single group of lines on the chart 7, that is, the lower filter will only pass currents of frequencies up to 315 cycles, the next filter will have a cut-off limit of 500 cycles and so on. While these filters are diagrammatically shown as separate elements this is done merely for convenience of illustration. The arrangement preferred is one in which the first key 2' will connect a filter for the first frequency range between the oscillator and the load circuit, and the other keys 2' will control the connection of additional inductances and capacities to constitute therewith a filter for the band of frequencies within which the setting falls.

The operation of the controller, and the relation of the various elements for a particular frequency setting will now be described. For purposes of illustration it will be assumed that the pointer 15 stands opposite point 205 on the first line of the first group of the chart 7, and it is desired to supply a frequency of 589 cycles to a load circuit. This frequency will be indicated by the first mark 44 on line four of the third group. Under the conditions assumed, the first keys 2 and 2' will be in the "up" position, and the other five "down" and hence the lever 23$^a$ will be in engagement with the short radial portion 54 of the cam 40$^a$, and the other five will be depressed by their engagement with the longest radial portions 56 of the cams 40$^b$, 40$^c$, 40$^d$, 40$^e$ and 40$^f$. Also the inductances 46 and 47 will be connected in the input and output circuits of the tube 45. A portion of the auxiliary condenser 4 will be connected in parallel with the condenser 49, and the contact arm 32 will be in "neutral" position, that is, the condenser 5 will be cut out.

To effect the desired adjustment, the lever 8 is rotated by the handle 10. The nut 13 will be moved longitudinally of the lever by the screw 9 until the pointer 15 carried by the nut will be opposite or coincide with line four of the third group. Simultaneously the drive train will rotate the contact arm 32 connected to gear 29 by the shaft 31 to successively engage the series of contacts 33 connected to the subdivided condenser 5 and will move the cam shaft 39 one step for each revolution of the gear 29. Engagement of each of the condenser contacts occurs at the moment the pointer 15 is opposite each of the lines in the first and second groups as well as at the instant it coincides with the first, second, third and fourth lines of the third group. At a definite point in the revolution of the disc 30 secured to the gear 29, the lug 36 mounted thereon will engage one arm 37 of the intermittent gear 38 and move it a step, thereby rotating the cam shaft one sixth of a revolution. The end of the arm 37 will project into the recess 35, which should be of such dimensions that the arm engaged by the lug will move freely into and out of this recess without binding. The engagement of the lug with the arm occurs when the pointer 15 is passing from the last line of one group to the first line of the next. During the remainder of the revolution of the gear 29, the adjacent arms 37 of the pin wheel engage the adjacent face of the disc 30 and thereby retain the cam shaft in the adjusted position.

As the pointer 15 traverses the space between the last line of the first group and the first line of the second group on the chart 7, the intermediate face 55 of cam 40$^a$ engages the lever 23$^a$ thereby returning the first pair of keys to "neutral" position. At the same time the lever 23$^b$ is drawn into engagement with the face 54 of cam 40$^b$ by its controlled spring 41 and the second pair of keys are thereby moved to the "up" position. During the time the pointer moves from the last line of group 2 to the first line of group 3, the face 55 of cam 40$^b$ comes into engagement with the lever 23$^b$ and forces it into "neutral" position against the action of its spring 41. Simultaneously therewith the face 54 of the cam 40$^c$ being opposite the lever 23$^c$, its associated spring 41 moves it into "up" position. Further rotation of the handle to move the pointer opposite the fourth line of this group rotates the arm 32 of the main condenser controller into engagement with the third contact of the series 33. The arm 8 is then rotated about the pivotal point 11 to a point opposite the first indicating mark 44. With this setting of the switches and controllers, two sections of both inductances 46 and 47 are short-circuited, three subdivisions of the main condenser and a portion of the auxiliary condenser are connected in parallel with the condenser 49, and a filter, adapted to pass the band of frequencies within which the desired frequency occurs, namely 500 to 795 cycles, is connected between the oscillator and the load circuit.

In similar manner any other frequency setting may be effected. If now it is desired to set the oscillator to supply a frequency of 2684 cycles, we will proceed as above to set the pointer 15 opposite the intersection of the third radial mark 44 with the seventh semi-circular line of the sixth group on the chart 7. In this case the levers 23$^a$, 23$^b$, 23$^c$, 23$^d$, and 23$^e$ would engage the intermediate faces 55 of their corresponding cams and the lever 23$^f$ would engage the face 54 of the cam 40$^f$, and hence the first five switches 2 and 2' would be in "neutral" position and the sixth pair of keys would be "up."

From the preceding description it will be evident that this attachment is designed to effect grouping of proper values of inductances and capacities to constitute oscillatory circuits and wave filters adapted to be associated with an electric discharge device and to indicate the frequency of the current supplied by the oscillator to a load circuit. Hence the type of oscillator, that is, whether the oscillatory circuit is connected as herein shown or in either the input or output circuit is a matter of choice. In other words, the invention may be used with any design of oscillator which is adapted to have the frequency of the current supplied thereby determined by the constants of a tuned circuit associated with a source of current.

The present invention has been described in connection with an oscillation generator, but obviously in certain of its aspects it may be used for other purposes.

While certain specific details have been shown and described with the object of completely and clearly disclosing the nature of the invention, it is to be understood that this invention is not limited thereto, but only by the scope of the attached claims.

What is claimed is:

1. The combination with an oscillation generator including an electric discharge device and an oscillatory circuit of means for adjusting the constants of said circuit including a plurality of switches and controllers, and means to actuate said switches and controllers in a definite sequence.

2. The combination with an oscillation generator including an electric discharge device and an oscillatory circuit of means for adjusting the constants of said circuit including a plurality of switches and controllers, and a control lever for actuating said switches and controllers in a definite sequence.

3. The combination with an oscillation generator comprising a source of current and an oscillatory circuit of means to adjust the constants of the circuit, means to indicate the frequency of the current supplied by the generator, a load circuit, a filter for connecting said generator to said load circuit for transmitting current from the generator to the load circuit, means to adjust the constants of said filter, and means for simultaneously actuating all of said means.

4. The combination with an oscillation generator comprising an electric discharge device and an oscillatory circuit of means to adjust the constants of the circuit, means to indicate the frequency of the current supplied by the generator, a load circuit, a filter connecting said generator to said load circuit for transmitting current from the generator to the load circuit, means to adjust the constants of said filter, and common means for actuating all of said means.

5. The combination with an oscillation generator comprising a source of current and an oscillatory circuit of a plurality of switches and controllers for adjusting the constants of said circuit, a filter associated with said generator including means to adjust the constants of said filter, and means to control said switches, controllers and filter adjusting means.

6. The combination with an oscillation generator comprising a source of current and an oscillatory circuit of a plurality of switches and controllers for adjusting the constants of said circuit, a filter associated with said generator including means to adjust the constants of said filter, a frequency indicator for the generator, and means to control said switches, controllers, adjusting means and indicator.

7. An oscillation generator comprising an electric discharge device, an oscillatory circuit, means for continuously varying the natural period of said oscillatory circuit, means for indicating the frequency of the current supplied by the generator, and means for controlling the operation of the varying means and indicator.

8. An oscillation generator attachment comprising a control lever adapted to be given two modes of movement, a plurality of switches, a plurality of rotary controllers, means operated by the two modes of movement of said lever for indicating the frequency of the current generated, and means associated with said lever to actuate said switches, controllers and indicating means.

9. An oscillation generator comprising an electric discharge device and an oscillatory circuit including inductance and capacities, and an attachment therefor comprising means to adjust the value of the inductance and one capacity stepwise and the other capacity continuously in definite sequence.

10. An oscillation generator including an electric discharge device and an oscillatory circuit having inductance and capacities, and an attachment therefor comprising means to adjust the value of the inductance and one capacity stepwise and the other capacity over its complete range in a continuous manner, the first capacity adjustments alternating with the inductance steps, and the other capacity adjustments alternating with the said first capacity adjustments.

11. An oscillation generator attachment comprising a control lever, a plurality of switches, a plurality of controllers, and means for giving said lever two modes of movement to operate said switches and controllers in a desired sequence.

12. An oscillation generator attachment comprising a control lever, a plurality of switches, a plurality of controllers, means for giving said lever two modes of movement, means for actuating said switches and one controller in proper sequence by one mode of movement of the lever, and for actuating the other controller by the other movement of said lever, whereby a unitary control is effected.

13. An oscillation generator attachment comprising a control lever, a plurality of switches, a plurality of controllers, means for giving said lever two modes of movement, means for transmitting one mode of movement of said lever to the switches and one controller to actuate them in a desired sequence, and means for operating the second controller by the other movement of said lever, whereby a unitary control is effected.

14. An oscillation generator attachment comprising a control lever, a plurality of switches, a plurality of controllers, means for giving said lever two modes of movement, means for operating one controller continuously and said switches intermittently in proper sequence by one mode of movement of said lever, and means to actuate the other controller by the other movement of said lever.

15. An oscillation generator attachment comprising a control lever, a pivot for said lever, a plurality of switches, a plurality of controllers, means for rotating said lever thereby operating one controller continuously and said switches intermittently in desired sequence and for oscillating said lever about said pivot to actuate the other controller.

16. An oscillation generator attachment comprising a control lever, a pivot for said lever, a plurality of switches, a plurality of controllers, means for rotating said lever to actuate the switches in a definite sequence and operate one of the controllers over a complete cycle alternately with the actuation of said switches and for oscillating said lever about said pivot to actuate the other controller.

17. An oscillation generator attachment comprising a control lever, a plurality of switches, a plurality of controllers, means for giving said lever two modes of movement to operate said switches and controllers in a desired sequence, and indicating means associated with said lever.

18. An oscillation generator attachment comprising a control lever, a plurality of switches, a plurality of controllers, means for giving said lever two modes of movement, means for actuating said switches and one controller in proper sequence by operating the lever according to one mode of movement and for actuating the other controller by the other movement of said lever, whereby a unitary control is effected, and indicating means associated with said lever and controlled by the dual motion thereof.

19. An oscillation generator attachment comprising a control lever, a plurality of switches, a plurality of controllers, means for giving said lever two modes of movement, means for transmitting movement of one mode of said lever to the switches and one controller to actuate them in a desired sequence, means for operating the second controller by the other movement of said lever, whereby a unitary control is effected, and indicating means associated with said lever.

20. An oscillation generator attachment comprising a control lever, a plurality of switches, a plurality of controllers, means for giving said lever two modes of movement, means for operating one controller continuously and said switches intermittently in proper sequence by one mode of movement of said lever, means to actuate the other controller by the other mode of movement of said lever, whereby a unitary control is effected, and means for indicating the adjustment effected.

21. An oscillation generator attachment comprising a control lever, a pivot for said lever, a plurality of switches, a plurality of controllers, means for rotating said lever thereby operating one controller continuously and said switches intermittently in desired sequence and for oscillating said lever about said pivot to actuate the other controller, and means for indicating the frequency setting effected.

22. An oscillation generator attachment comprising a control lever, a pivot for said lever, a plurality of switches, a plurality of controllers, means for rotating said lever to actuate the switches in a definite sequence and operate one of the controllers over a complete cycle alternately with the actuation of said switches and for bodily rotating said lever about said pivot to actuate the other controller, and indicating means associated with said lever.

23. The combination with an oscillation generator comprising an electric discharge device and an oscillatory circuit, a filter associated with said generator, means to adjust the constants of the circuit and filter including a plurality of switches and controllers, and means to actuate said switches and controllers in a definite sequence.

24. The combination with an oscillation generator comprising an electric discharge device and an oscillatory circuit, a load circuit, a filter connected to said generator and said load circuit for transmitting oscillations from the generator to the load circuit, a plurality of switches and controllers for the oscillatory circuit, a plurality of switches for the filter, and means for simultaneously actuating one switch of each series and said controllers in definite sequence.

25. The combination with an oscillation generator comprising an electric discharge device and an oscillatory circuit, a load circuit, a filter connected to said generator and said load circuit for transmitting oscillations from the generator to the load circuit, means to adjust the constants of the oscillatory circuit and filter including a plurality of switches and controllers, a frequency indicator, and means to actuate said switches and controllers in a definite sequence and also said indicator.

26. The combination of an oscillatory circuit including inductance and capacities, a control lever adapted to be given two modes of movement, means to transmit one mode of movement of said lever to vary one capacity continuously over a complete cycle, means to transmit the other motion of said lever to vary the other capacity stepwise over its complete range and the inductance stepwise over its complete range, the lever being moved alternately in the two modes.

27. The combination with an oscillatory circuit, of means for adjusting the constants of said circuit including a plurality of switches and controllers, and means to actuate said switches and controllers in a definite sequence.

28. The combination with an oscillatory circuit, of means for adjusting the constants of said circuit including a plurality of switches and controllers, and a control lever for actuating said switches and controllers in a definite sequence.

29. The combination with an oscillation generator including an electric discharge device and an oscillating frequency determining circuit of means for adjusting the constants of said circuit including a plurality of switches and controllers, and a control lever adapted to be given two modes of movement to operate said switches and controllers in a desired sequence.

30. The combination with an oscillation generator comprising a source of current, an oscillatory circuit, means for adjusting the constants of said circuit, means to indicate the frequency of the current produced by said generator, a load circuit, a filter for connecting said generator to said load circuit for transmitting current from the generator to the load circuit, means for adjusting the constants of said filter, and a control lever adapted to be given two modes of movement to operate said circuit and filter adjusting means in desired sequence and to indicate the frequency of the oscillations produced by said generator.

In witness whereof, I hereunto subscribe my name this 20th day of June, A. D. 1921.

HENRY C. HARRISON.